(12) United States Patent
Butner et al.

(10) Patent No.: US 8,970,492 B2
(45) Date of Patent: Mar. 3, 2015

(54) REMOTE SESSION CONTROL USING MULTI-TOUCH INPUTS

(75) Inventors: Christopher R. Butner, Seattle, WA (US); Benjamin Homelson Meister, Redmond, WA (US); Elton Saul, Kirikland, WA (US); Rishad Madhura Kuzhiyil, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 245 days.

(21) Appl. No.: 13/602,013

(22) Filed: Aug. 31, 2012

(65) Prior Publication Data

US 2013/0328779 A1   Dec. 12, 2013

Related U.S. Application Data

(60) Provisional application No. 61/657,539, filed on Jun. 8, 2012.

(51) Int. Cl.
*G06F 3/033*   (2013.01)

(52) U.S. Cl.
USPC ............ 345/157; 345/163; 345/173; 715/863

(58) Field of Classification Search
CPC ....... G06F 3/017; G06F 3/0227; G06F 3/041; G06F 3/0488
USPC .................. 345/156, 157, 163, 173; 709/203; 715/863
See application file for complete search history.

(56) References Cited

U.S. PATENT DOCUMENTS

| | | | |
|---|---|---|---|
| 5,990,875 A | 11/1999 | Bi et al. | |
| 6,292,181 B1 | 9/2001 | Banerjee et al. | |
| 2004/0130568 A1* | 7/2004 | Nagano et al. ................ | 345/733 |
| 2006/0230156 A1* | 10/2006 | Shappir et al. ................ | 709/227 |
| 2007/0288599 A1* | 12/2007 | Saul et al. ..................... | 709/218 |
| 2009/0161027 A1* | 6/2009 | Hardacker et al. ............ | 348/734 |
| 2009/0235177 A1* | 9/2009 | Saul et al. ..................... | 715/740 |
| 2009/0282359 A1* | 11/2009 | Saul et al. ..................... | 715/784 |
| 2011/0066971 A1* | 3/2011 | Forutanpour et al. ......... | 715/788 |
| 2011/0246904 A1* | 10/2011 | Pinto et al. .................... | 715/740 |
| 2011/0271183 A1 | 11/2011 | Bose et al. | |
| 2011/0314093 A1* | 12/2011 | Sheu et al. .................... | 709/203 |
| 2012/0054671 A1 | 3/2012 | Thompson et al. | |
| 2012/0092277 A1* | 4/2012 | Momchilov ................... | 345/173 |
| 2012/0127206 A1* | 5/2012 | Thompson et al. ........... | 345/661 |

FOREIGN PATENT DOCUMENTS

WO   WO 2012048007 A2   4/2012

* cited by examiner

*Primary Examiner* — Joe H Cheng
(74) *Attorney, Agent, or Firm* — Jim Banowsky; Leonard Smith; Micky Minhas

(57) ABSTRACT

Accessing and controlling a remote desktop of a remote computing system using a multi-touch display of a local computing system. The remote desktop is displayed on the multi-touch display. Upon detecting a user contact with the multi-touch display when the display is not engaged as a trackpad, the multi-touch display is engaged as a trackpad; and the user contact is assigned as a cursor pointer for controlling the multi-touch display as a trackpad. In accordance with some embodiments described herein, left and right pointer controls (e.g., left mouse button and right mouse button) controls may be emulated also. This remote desktop technique allows multi-touch displays to be used to manipulate remote desktops, even for those that do not support multi-touch semantics, interaction techniques, or metaphors.

20 Claims, 17 Drawing Sheets

US 8,970,492 B2

REMOTE SESSION CONTROL USING MULTI-TOUCH INPUTS

CROSS-REFERENCE TO RELATED APPLICATIONS

The present application claims priority under 35 U.S.C. 119(e) to U.S. provisional application Ser. No. 61/657,539 filed Jun. 8, 2012, which provisional patent application is incorporated herein by reference in its entirety.

BACKGROUND

Remote desktop technology provides a user with a graphical interface of a remote computing system on the display of a local computing system. This allows the user to view the desktop (hereinafter, the "remote desktop") of the remote computing system on the local computing system, and provide user input on the local computing system that is applied to the remote desktop at the remote computing system. Thus, the user can access and control a remote desktop. The concept of a user accessing and controlling a remote desktop is referred to herein as "remote desktopping".

Remote desktop technology is useful in a wide variety of scenarios. For instance, perhaps a computer specialist is being authorized to take over the desktop of a remote customer for purposes of troubleshooting or improving the performance of the customer's computer. Alternatively, perhaps a user is accessing the user's work computer from the user's computing system at home, on vacation, or while traveling.

Often, the local computing system has different display or input capabilities as compared to the remote computing system. For instance, multi-touch displays, such as tablet computers, have been recently commercialized. Rather, or in addition to using a conventional pointer device (such as a mouse, trackpad, touchpad or pen), multi-touch inputs detect user input by detecting user contact with one or more portions of the display.

BRIEF SUMMARY

At least one embodiment described herein relates to accessing and controlling the desktop of a remote computing system using a multi-touch display of a local computing system. The remote desktop is displayed on the multi-touch display. Upon detecting a user contact with the multi-touch display when the display is not engaged as a trackpad, the multi-touch display is engaged as a trackpad; and the user contact is regarded as a cursor pointer (the multi-touch display being interpreted as the trackpad).

In accordance with some embodiments described herein, left and right pointer controls (e.g., left mouse button and right mouse button) controls may be emulated also. For instance, upon detecting a second user contact while the first user contact is still applied to the multi-touch display, if the second user contact is within a first relative position with respect to (e.g., left of) the first user contact, the second user contact is interpreted as a pressing of a first pointer control (a left pointer control), and the appropriate control press command is transmitted to the remote computing system. The first pointer control is interpreted as remaining pressed until either the first or second user contact has ended, after which a first control release command is transmitted to the remote computing system.

On the other hand, if the second user contact is within a second relative position with respect to (e.g., right of) the first user contact, the second user contact is interpreted as a pressing of a second pointer control (a right pointer control), and the appropriate control press command is transmitted to the remote computing system. The second pointer control is interpreted as remaining pressed until either the first or second user contact has ended, after which a second control release command is transmitted to the remote computing system.

This remote desktop technique allows multi-touch displays to be used to manipulate remote desktops, even those that do not support touch. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the accessing and controlling of the desktop of a remote computing system is described using a multi-touch display of a local computing system. The remote desktop is displayed on the multi-touch display. Upon detecting a user contact with the multi-touch display when the display is not engaged as a trackpad, the multi-touch display is engaged as a trackpad; and the user contact is regarded as cursor pointer (the multi-touch display being interpreted as the trackpad). In accordance with some embodiments described herein, left and right pointer controls (e.g., left mouse button and right mouse button) controls may be emulated also. This remote desktop technique allows multi-touch displays to be used to manipulate remote desktops, even those that do not support touch. First, some introductory discussion regarding computing systems will be described with respect to FIG. 1. Then, embodiments of the remote desktop techniques will be described with respect to FIGS. 2 through 5. The specific user scenarios will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
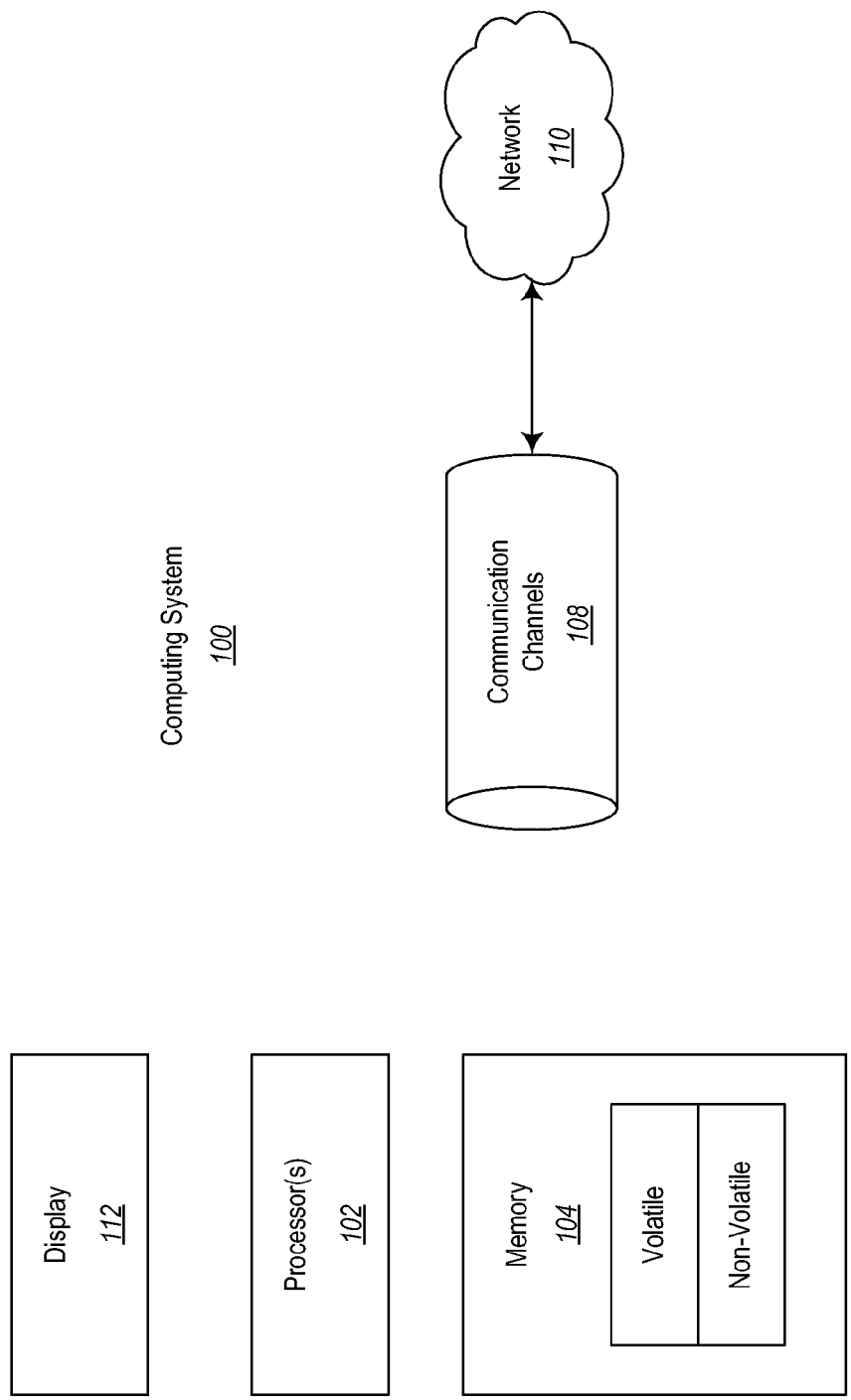
FIG. 1 illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system may also include a display 112 for providing a graphical user interface to the user.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
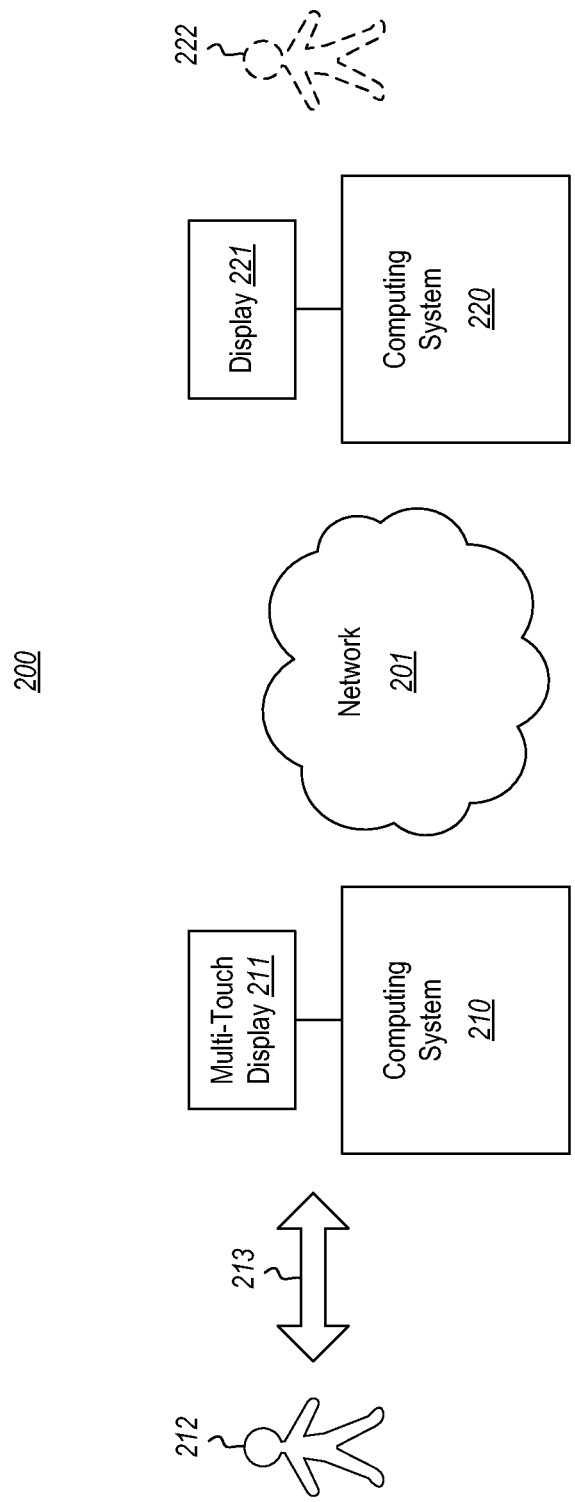
FIG. 2 illustrates a network environment in which a user interfaces with a location computing system in order to control a desktop generated by a remote computing system.

FIG. 2 illustrates a network environment 200 that includes a first computing system 210 that has a multi-touch display 211 and an associated user 212 that interfaces 213 with the first computing system 210. The first computing system 210 is connected over a network 201 to a second computing system 220 that has a display 221 and potentially, but not necessarily, a user 222. The first computing system 210 and the second computing system 220 may each be structured as described for the computing system 100 of FIG. 1, although not required. The network 201 may be the Internet, another Wide Area Network, a Local Area Network, any other type of network, and combinations thereof.

The first computing system 210 will be referred to as a "local" computing system since the computing system 210 is local to the user 212, or at least the display 211 is close to the user 212. For instance, it is possible that the first computing system 210 may be implemented as a virtual machine, in which the underlying processing capability of the first computing system 210 need not be local to the user 212 (but the display 211 still would be local to the user 212). The second computing system 220 may also be referred to as a "remote" computing system, as the second computing system 220 may be remote from the user 212 of the local computing system 210, or at least is further from the user 212 than the local display 211.

Figure 3A:
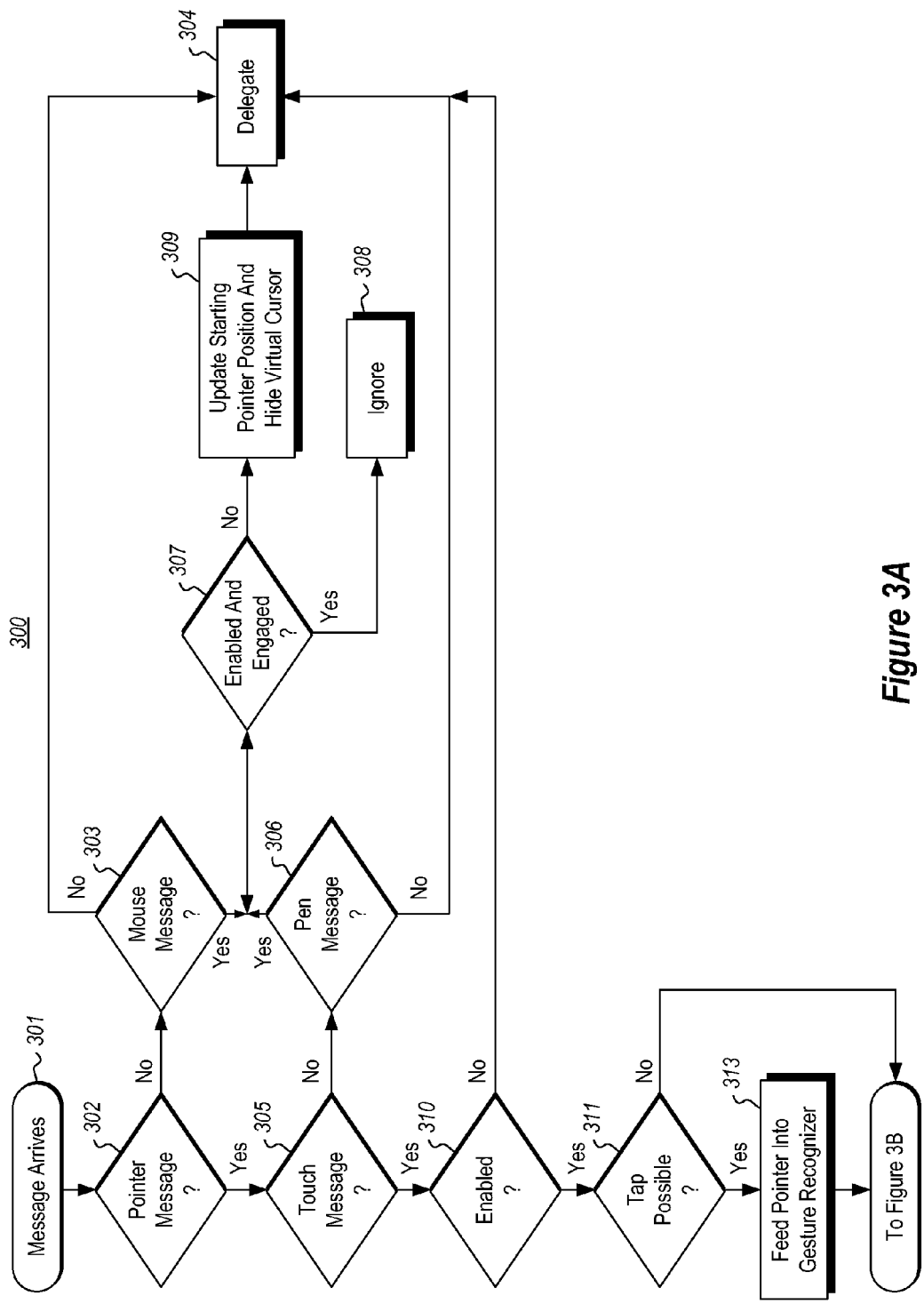
FIGS. 3A and 3B collectively illustrate a flowchart of a method for performing remote desktop functionality using a multi-touch display.
Figure 3B:
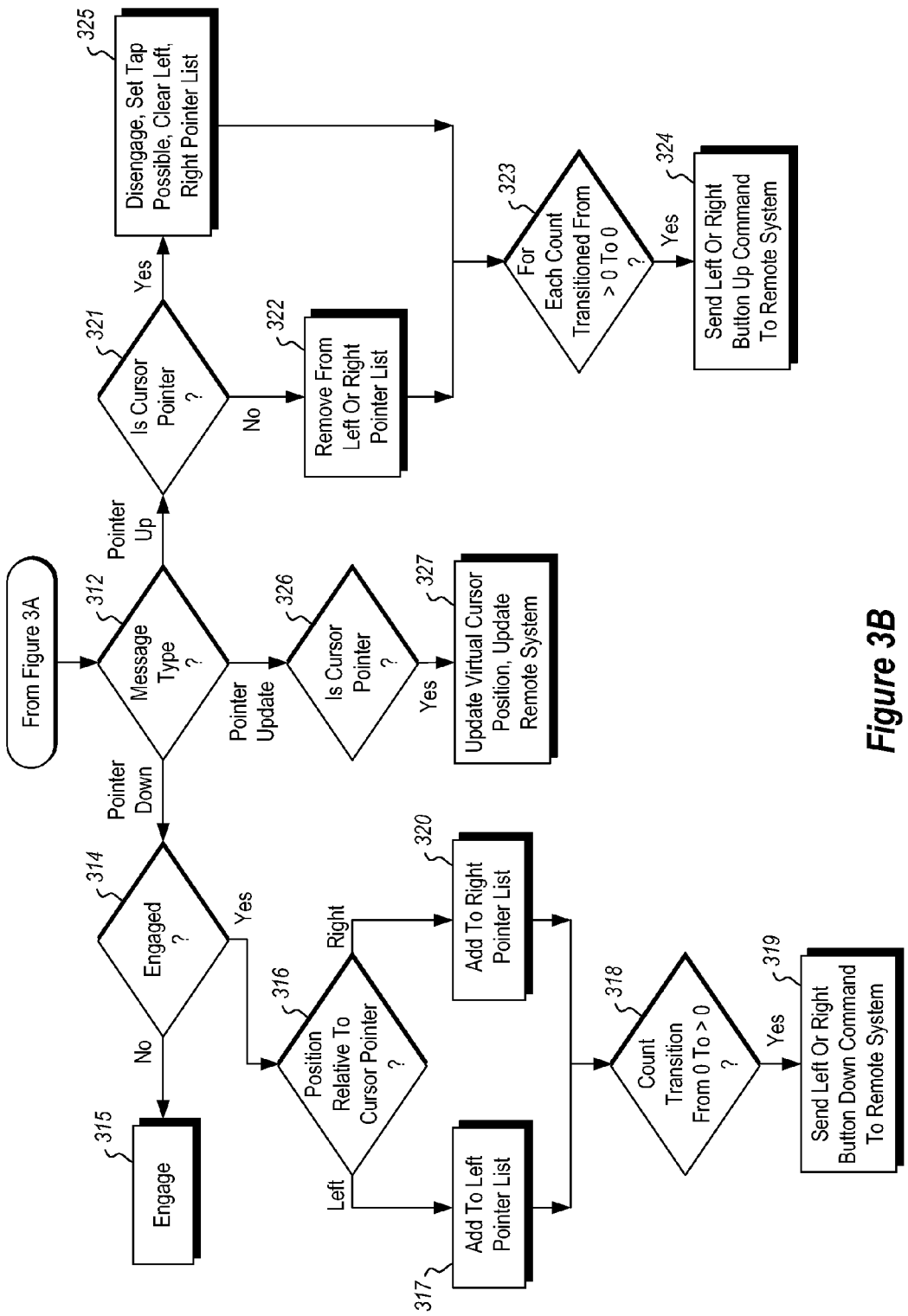

FIGS. 3A and 3B collectively illustrate a flowchart of a method 300 for performing remote desktop functionality using a multi-touch display. The method 300 may be performed, for example, by the local computing system 210 of FIG. 2 in response to the user 212 interacting with the multi-touch display 211, in order to control a graphical user interface (e.g., a desktop) that is displayed on the display 221 (or at least that is generated by the remote computing system 220 in the case that the remote display 221 is off).

The method 300 may, for example, be performed by the local computing system 210 in response to the local computing system executing computer-executable instructions. Such computer-executable instructions may, for example, be stored on computer-readable media, such as computer storage media, that may be included as part or all of a computer program product available to the local computing system 210. As the method 300 may be performed by the computing system 210 of FIG. 2, the method 300 of FIG. 3 will be described with occasional reference to FIG. 2.

The method 300 is performed when a message arrives (act 301) indicative of a cursor sampling event that occurs with a remote desktop that is displayed on the multi-touch display 211. For instance, such a message might be received in response to a mouse event, a pen event, another pointer event, or a multi-touch display event. The remote desktop displayed on the multi-touch display 211 is representative of a graphical user interface (such as a desktop) displayed on the remote display 221, or at least is representative of a graphical user interface (such as a desktop) generated by the remote computing system 220 using the operating system of the remote computing system 220.

In the illustrated specific embodiment of the method 300, there are three types of pointer devices that may be used to provide input. There is the multi-touch display 211 that itself may be engaged as a trackpad under some circumstances. Furthermore, when the multi-touch display 211 is not engaged as a trackpad, a connected mouse or pen may be used to provide pointer input.

In decision block 302, the method 300 determines whether or not the message is a pointer message. Suppose, for example, that pointer message includes messages that represent pointer input from a pen, or from the multi-touch display when engaged as a trackpad, but not from a mouse.

If the method 300 determines that the message is not a pointer event (No in decision block 302), it is further determined whether the message is a mouse message (decision block 303) representative of a mouse event caused by a physical mouse providing input to the local computing system 210. If the method 300 determines that the message is not a mouse event either (No in decision block 303), then the message is delegated to the regular message/input processing of the local computing system 210 (act 304).

Returning to decision block 302, if the method 300 determines that the message is a pointer event (Yes in decision block 302), it is further determined whether the message is a touch message (decision block 305). A touch message would be indicative of the user 212 touching the multi-touch display 211. If the message is not a touch message (No in decision block 305), it is then determined whether the message is a pen message (decision block 306) representative of a pen event caused by a physical pen providing input to the local computing system 210. If the method 300 determines that the message is not a pen event either (No in decision block 306), then the message is delegated to the regular message/input processing of the local computing system 210 (act 304).

If 1) the message is a mouse message (Yes in decision block 303), or a pen message (Yes in decision block 305), then it is determined whether or not the trackpad functionality of the multi-touch display is enabled and engaged (decision block 307). For instance, the trackpad functionality of the multi-touch display might be disabled by the user 212 because the user 212 feels more comfortable using a pen, mouse, or other connected pointer device in interfacing with the multi-touch display 211. On the other hand, if the user wants the multi-touch display to behave as a trackpad when the user engages the multi-touch display as such, then the trackpad functionality of the multi-touch display may be enabled. Additionally, the trackpad functionality is engaged if the trackpad functionality is enabled, and the user is actually interfacing with the multi-touch display as a trackpad. In that case, (Yes in decision block 307), the mouse or pen message is ignored (act 308) because the trackpad functionality takes precedence in the embodiment of FIG. 3. Thus, the other external pointer devices are effectively disabled.

If 1) the trackpad functionality of the multi-touch display is disabled, or 2) even if enabled, the trackpad functionality is not being presently engaged by the user (No in decision block 307), then the virtual cursor is hidden and the mouse or pen cursor position is updated (act 309), and the processing is further delegated to the regular message/input processing of the local computing system (act 304). The virtual cursor represents a cursor that corresponds to the use of the multi-touch display 211 as a trackpad. Since the display 211 is not being used as a trackpad in these circumstances (No in decision block 307), the virtual cursor is hidden, so as to avoid confusion with the actual mouse or pen cursor.

Returning to decision block 305, if the message is representative of a touch event on the multi-touch display (Yes in decision block 305) (such as would be the case if the user contacts the multi-touch display with a finger), it is then determined whether or not the trackpad functionality of the multi-touch display 211 is enabled (decision block 310). If the trackpad functionality is not enabled (No in decision block 310), then the touch message processing is delegated to the regular message/input processing of the local computing system 210 (act 304).

On the other hand, if the trackpad functionality of the multi-touch display 211 is enabled (Yes in decision block 310), then it is determined whether or not tap is possible (decision block 311). Tap is typically possible in this method when there are no user touch contacts that are representative of present use of the multi-touch display as a trackpad. If tap is not possible (No in decision block 311), then the touch message type is determined (decision block 312—see FIG. 3B). If tap is possible (Yes in decision block 311), then the touch message is fed to a gesture recognizer (act 313), and then the touch message type is determined (decision block 312—see FIG. 3B).

Figure 4:
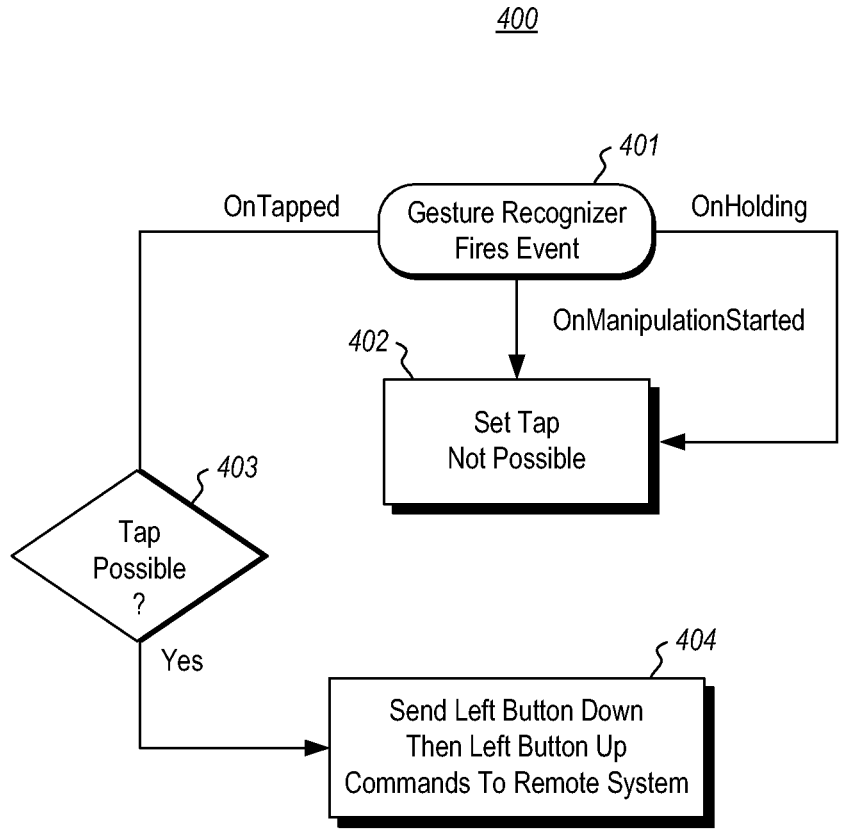
FIG. 4 illustrates a flowchart of a method for operation of a gesture recognizer.

The gesture recognizer then proceeds processing in parallel with the method 300 continuing operation along the flow of FIG. 3B. FIG. 4 illustrates a method 400 operation of the gesture recognizer. The gesture recognizer generates (act 401) three different events that are relevant to this method 400. An OnHolding event is fired if the user contact has lasted more than a predetermined time (that is longer than typical for a tap gesture). In that case, the tap is not possible state is entered (act 402). An OnManipulationStarted event is fired if the user has moved the user contact (while maintaining contact) a predetermined distance on the multi-touch display. In that case, again the tap is not possible state is entered (act 402). An OnTapped event is fired if the gesture recognizer detects a brief user contact that does not move significantly while in contact with the multi-touch display. Such is representative of a tap motion. In this case, if a tap is possible (Yes in decision block 403), this may be interpreted as a click of a pointer counter control (act 404). For instance, this might be interpreted as an actuation of a selection control (such as a left click of a mouse- or a right click of the mouse as is often the case when the computing system is configured for a left-handed person). Furthermore, the remote computing system is notified of the click event (act 404).

Returning to FIG. 3B, recall that the method 400 may be in process as the method 300 determines the type of touch message (decision block 312). If the touch message is a pointer down message, this would represent that the user has made a new touch contact with the multi-touch display 211. In that case, the new user contact is assigned an identifier (not shown), and the method would further determine whether or not the trackpad functionality of the multi-touch display 211 is engaged (decision block 314). If the trackpad functionality is not engaged (No in decision block 314), the trackpad functionality is engaged (act 315), and the user contact is assigned as a cursor pointer that is to be used in order to operate the trackpad. In this engaged state, the multi-touch display 211 acts as a touchpad.

If the trackpad functionality was already engaged (Yes in decision block 314), then this means that the new user contact is not the first user contact, but a subsequent user contact made while the cursor position is still corresponding to the initial user contact. In accordance with embodiments described herein, this subsequent user contact may be interpreted as a pressing of a pointer control. For instance, if the subsequent user contact is within a relative position with respect to the current position of the initial user contact, this might be interpreted as pressing a pointer control. Accordingly, a respective pointer command representing this pressing is caused to be transmitted to the remote computing system 220.

In the specific embodiment of the method 300 of FIG. 3, if the relative position of the subsequent user contact is left of the current position of the initial user contact (Left in decision block 316), then this subsequent user contact is added to the left pointer list (act 317), and the counter for the left pointer list is incremented by one. Thus, there can be multiple subsequent user contacts that are represented in the left pointer list.

For instance, suppose that the user 212 uses only the right hand to interface with the multi-touch display 211. Suppose further that the user 212 uses the middle finger to make the initial user contact, and thus the middle finger movement controls the cursor position. If, while the middle finger remains in contact, the user were to use the index finger to touch the multi-touch display to the left of the middle finger, then this first subsequent contact would be added to the left pointer list, and the counter for the left pointer list would be incremented from 0 to 1. If, while the middle finger and index finger remain touching the multi-touch display, the user were to use the thumb to touch the multi-touch display to the left of the middle finger, then this second subsequent contact would be added to the left pointer list, and the count for the left pointer list would be incremented from 1 to 2.

If the addition to the left pointer list caused the count for that list to go from 0 to 1 or more (Yes in decision block 318), then the left pointer control activation message is sent to the remote computing system 220 (act 319), causing the desktop at the remote computing system 220 to behave as though the left pointer control (e.g., the left mouse button) was pressed.

In the specific embodiment of the method 300 of FIG. 3, if the relative position of the subsequent user contact is right of the current position of the initial user contact (Right in decision block 316), then this subsequent user contact is added to the right pointer list (act 320), and the counter for the right pointer list is incremented by one. Thus, there can also be multiple subsequent user contacts that are represented in the right pointer list.

For instance, suppose that the user 212 uses only the right hand to interface with the multi-touch display 211. Suppose further that the user 212 uses the middle finger to make the initial user contact, and thus the middle finger movement controls the cursor position. If, while the middle finger remains in contact, the user were to use the ring finger to touch the multi-touch display to the right of the middle finger, then this first subsequent contact would be added to the right pointer list, and the counter for the right pointer list would be incremented from 0 to 1. If, while the middle finger and ring finger remain touching the multi-touch display, the user were to use the baby finger (i.e., pinky) to touch the multi-touch display to the right of the middle finger, then this second subsequent contact would be added to the right pointer list, and the count for the right pointer list would be incremented from 1 to 2.

If the addition to the right pointer list caused the count for that list to go from 0 to 1 or more (Yes in decision block 318), then the right pointer control activation message is sent to the remote computing system 220 (act 319), causing the desktop at the remote computing system 220 to behave as though the righter pointer control (e.g., the right mouse button) was pressed.

Returning to decision block 312, if the touch message is a pointer up message, or otherwise indicates that a user contact is no longer of effect, then it is determined whether the user contact was assigned to the cursor pointer (decision block 321).

If the user contact were not the cursor pointer (e.g., the thumb, index finger, ring finger, or baby finger was lifted from the multi-touch display) (No in decision block 321), then the user contact has ceased, and is removed from the respective pointer list (act 322), and the count for that corresponding list is decremented (not shown). For instance, in the example above, if the user were to remove the thumb or index finger (of the right hand) from the multi-touch display, then the corresponding user contact would be removed from the left pointer list, and the left pointer count would be decremented. If the user were to remove the ring or baby finger (of the right hand) from the multi-touch display, then the corresponding user contact would be removed from the right pointer list, and the right count would be decremented.

Furthermore, if the decrement caused the count of the left pointer list to reach 0 (Yes in decision block 323), then the left pointer control release command is transmitted to the remote computing system 220 (act 324) causing the remote computing system 220 to treat the graphical user interface (e.g., the desktop) as though the left pointer control (e.g., the left mouse button) was released. If the decrement caused the count of the right pointer list to reach 0 (Yes in decision block 323), then the right pointer control release command is transmitted to the remote computing system 220 (act 324) causing the remote computing system 220 to treat the graphical user interface (e.g., the desktop) as though the right pointer control (e.g., the right mouse button) was released.

Returning to decision block 321, if the user contact that ended were a cursor pointer (e.g., the middle finger in the example above) (Yes in decision block 321), then the trackpad functionality of the multi-touch display 211 is disengaged, the left and right pointer lists are cleared, and their respective counts are reset to zero (act 325). In this state, other external pointer devices may again interact with the multi-touch display (No in decision block 307—see FIG. 3A). Furthermore, since the counts for both pointer lists are now zero (Yes in decision block 323), if there were an active left and/or right pointer control being pressed, an appropriate control release command is transmitted to the remote computing system 220 (act 324), causing the remote computing system 220 to treat the graphical user interface (e.g., the desktop) as though the respective pointer control (e.g., the left and/or right mouse button) was released.

Returning to decision block 312, if the touch message were a pointer update, this represents a new update regarding position of a user contact. For instance, the position of each current user contact may be monitored a number of times per second. Thus, the pointer update may represent movement of the user contact. If the user contact is not the cursor pointer (No in decision block 326), then, the movement may be ignored. However, if the user contact is the cursor pointer (e.g., the middle finger in the example above) (Yes in decision block 326), then the cursor point is what actually controls the trackpad functionality. Accordingly, the cursor position is updated on the multi-touch display (act 327), and a corresponding cursor movement command is caused to be transmitted to the remote computing system 220 (act 326), causes the graphical user interface (e.g., the desktop) of the remote computing system 220 to also follow the movement.

Figure 5:
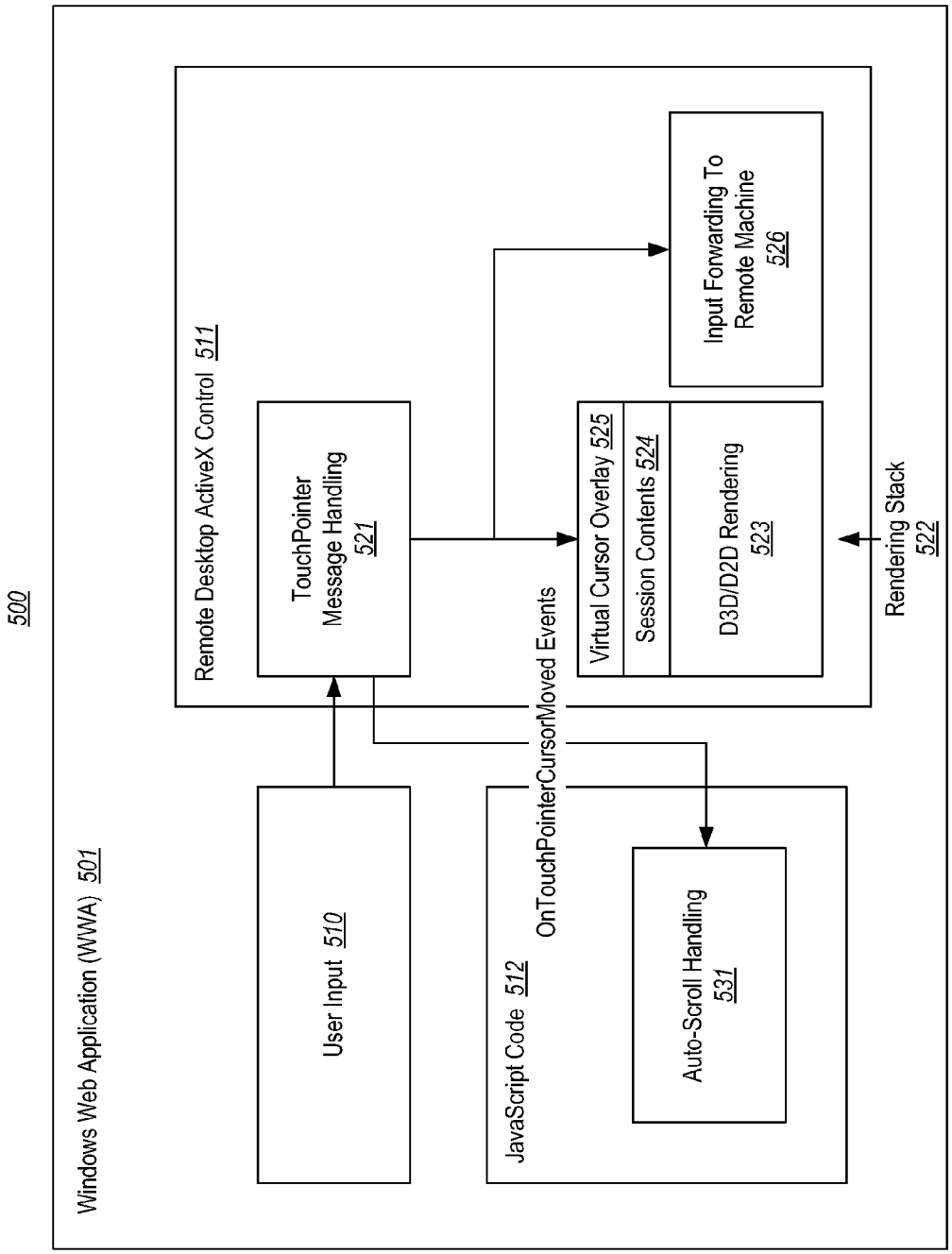
FIG. 5 illustrates an architecture that may be used on the local computing system in order to perform the method of FIG. 3.

FIG. 5 illustrates an architecture 500 that may be used on the local computing system 210 in order to perform the method 300 of FIG. 3. The architecture may be implemented, for example, as a WINDOWS web application (WWA) 501, although not required. The application 501 includes a remote desktop ActiveX control 511 that receives user input 510. Javascript code 512 includes an auto-scroll handling component 531.

In response to each item of user input (e.g., each occurrence of act 301 in FIG. 3A), the remote desktop control 511 receives that user input. For those user inputs that represent a touch control (e.g., Yes in decision block 305), the touch user input is provided to the touchpointer message handling component 521, which performs the remainder of FIG. 3 downstream of Yes in decision block 305.

In order to render the virtual cursor, the rendering stack 522 is used including, D3D/D2D rendering component 523, session contents 524, and a virtual cursor overlay 525. For instance, the stack 522 may be used to re-render the virtual cursor in response to movement (see act 327 of FIG. 3B), to visualize the virtual cursor when the trackpad functionality is engaged (see act 315 of FIG. 3B), or to hide the virtual cursor when other pointer devices are used (see act 309 of FIG. 3A).

The communication component 326 is used to forward cursor commands to the remote computing system (as in acts 319, 324 and 327 of FIG. 3B).

In order to handle scrolling, if a certain event occurs that is indicative of the virtual cursor pointer being at a position near the border to the visible display boundaries, that event is provided to the auto-scroll handling 531. The auto-scroll handling determines whether to left scroll, right scroll, up scroll, or down scroll, depending on the virtual cursor position and a most recent movement direction of the virtual cursor. For instance, scroll up may be performed if the virtual cursor positioned is clamped to the upper boundary of the visible display, and a further movement of the cursor pointer is urged upward, and so forth for other directions. In one embodiment, the auto-scroll handling scrolls in a certain direction if (a) it is possible to scroll in that direction, and (b) the cursor is within some percentage (e.g., 15 percent) of the boundary, measured as a fraction of the viewport length in that dimension. So, for example, 15% of the vertical dimension from the top if scrolling upwards, 15% of the horizontal dimension from the right if scrolling rightwards, and so forth. The cursor will remain at the 15% from the boundary while scrolling, until scrolling is no longer possible, at which point further motion in that direction would cause the cursor to move towards the boundary until contacting the boundary.

Accordingly, a powerful mechanism for using a multi-touch display to perform remote desktop techniques has been described. Specific user scenarios will now be described with respect to FIGS. 6A through 10H. In each of these user scenarios, the user performs interactions with a multi-touch display using the right hand to thereby potentially perform quite complex pointer tasks.

Figure 6A:
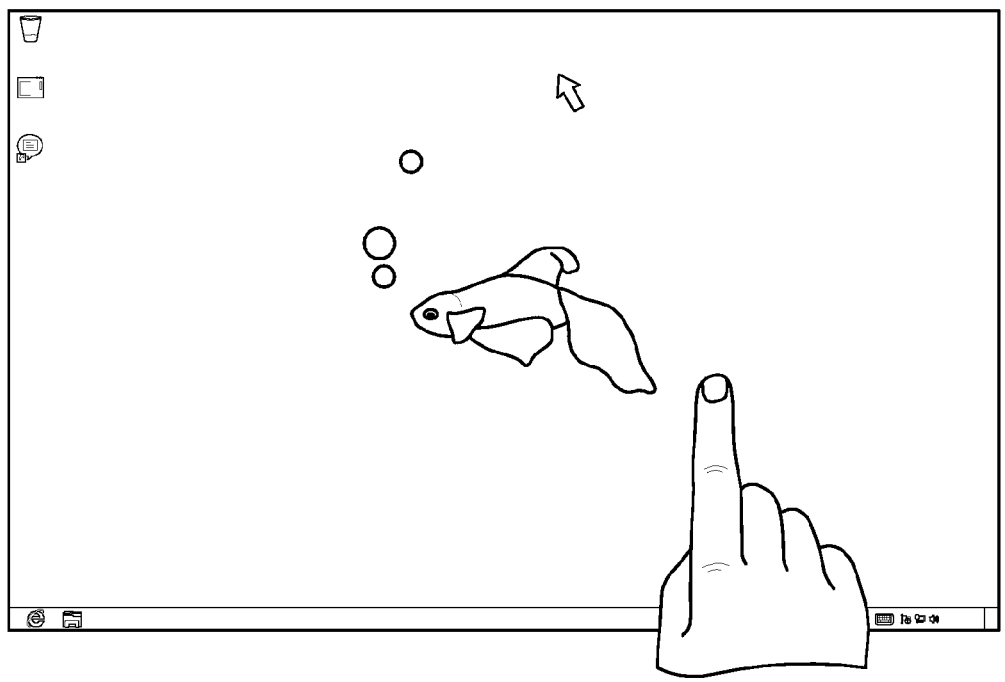
FIGS. 6A through 6C show basic cursor movement using the multi-touch display as a trackpad.
Figure 6B:
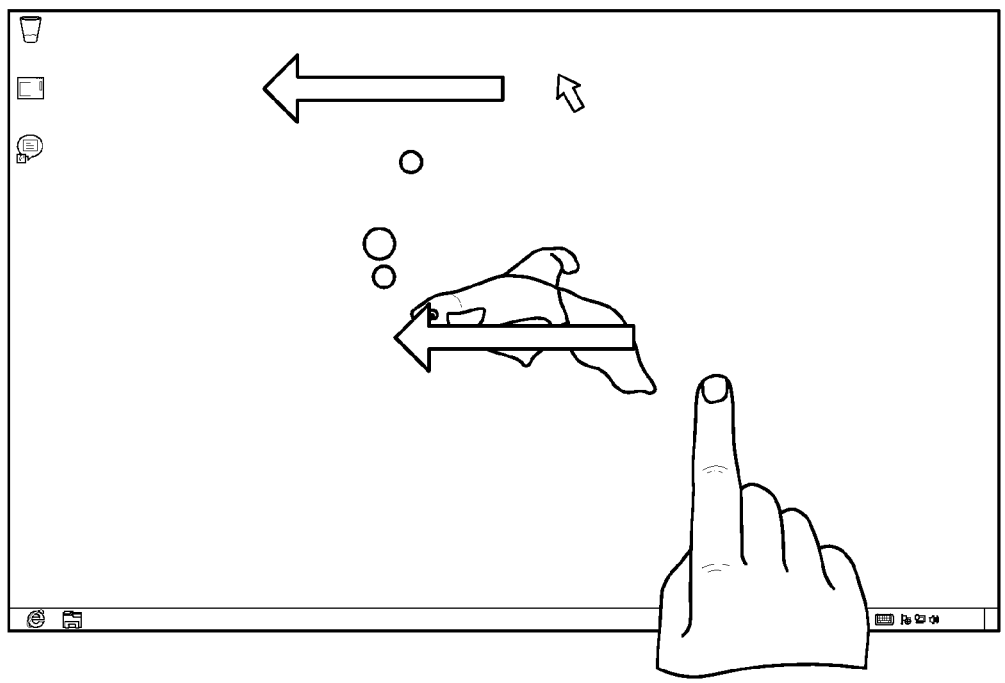
Figure 6C:
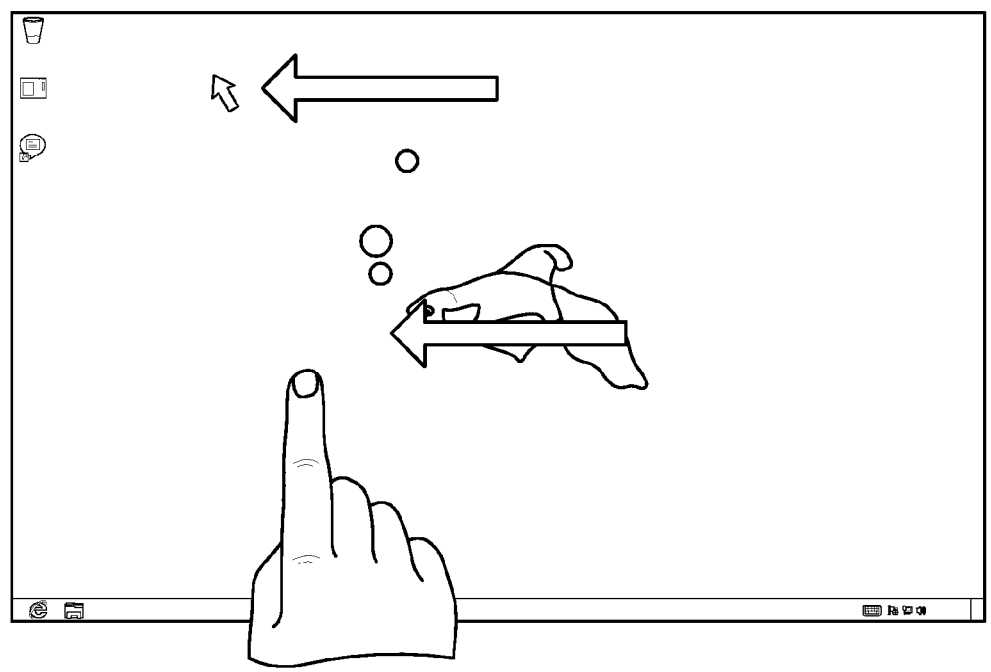

FIGS. 6A through 6C show basic cursor movement using the multi-touch display as a trackpad. In FIG. 6A, the user contacts a finger to the display thereby engaging the display as a trackpad. The cursor's position is independent of the initial position of user contact. In FIG. 6B, the user is to drag the finger to the left in order to cause a corresponding relative movement of the cursor to the left. In FIG. 6C, the user has completed the drag motion thereby accomplished the desired movement of the cursor to the left. Thus, the display acted as a trackpad input device, as well accomplishing the function of a display.

Figure 7A:
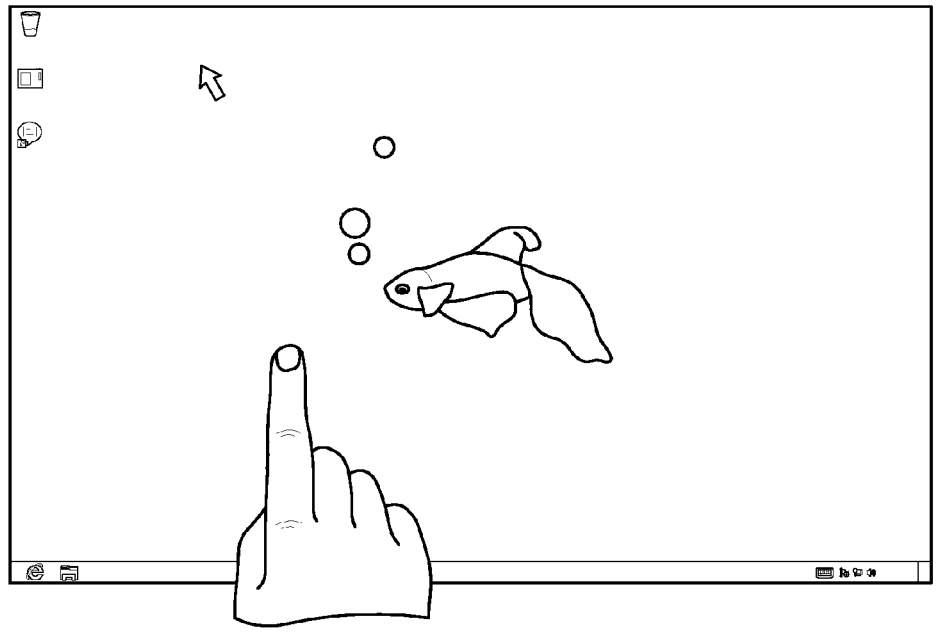
FIGS. 7A and 7B show user simulation of the pressing of a left pointer control (such as a left mouse button)
Figure 7B:
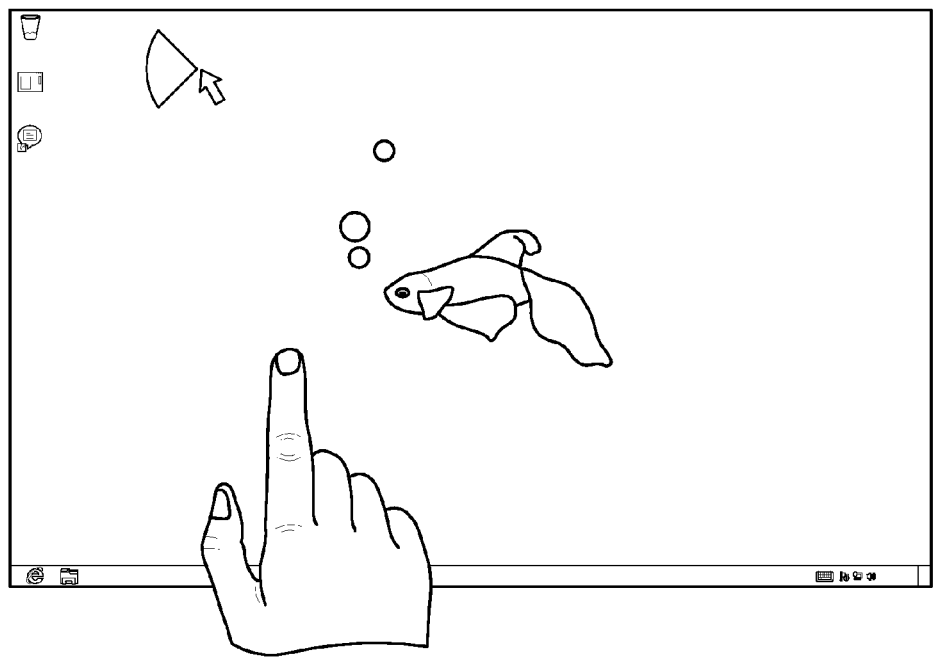

In FIGS. 7A and 7B, the user simulates the pressing of a left pointer control (such as a left mouse button). FIG. 7A is similar to FIG. 6C except without arrows to cleanly show the remote desktop. In FIG. 7A, the user contacts (or retains contact with) the display, thereby the display is engaged as a trackpad input device, although there is no movement of the cursor in the example of FIGS. 7A and 7B. In FIG. 7B, the user contacts a second finger to the display leftwards of the current position of the initial finger. This simulates pressing a left pointer control (such as a left mouse button). The user releases the left pointer control by simply removing the second finger. Thus, the user may intuitively simulate pressing and releasing of a left pointer control.

Figure 8A:
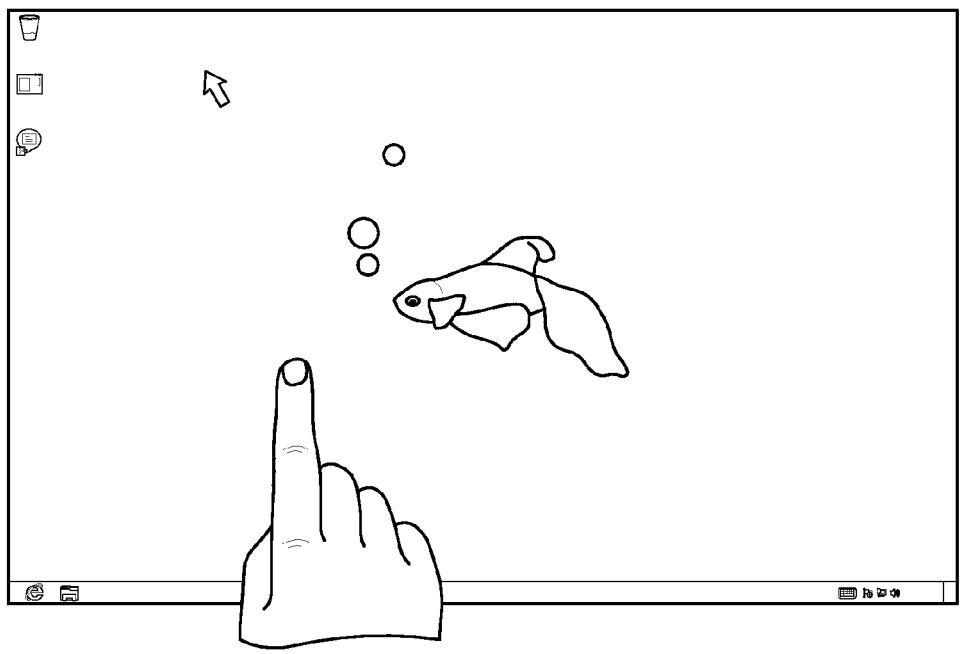
FIGS. 8A and 8B show user simulation of the pressing of a right pointer control (such as a right mouse button)
Figure 8B:
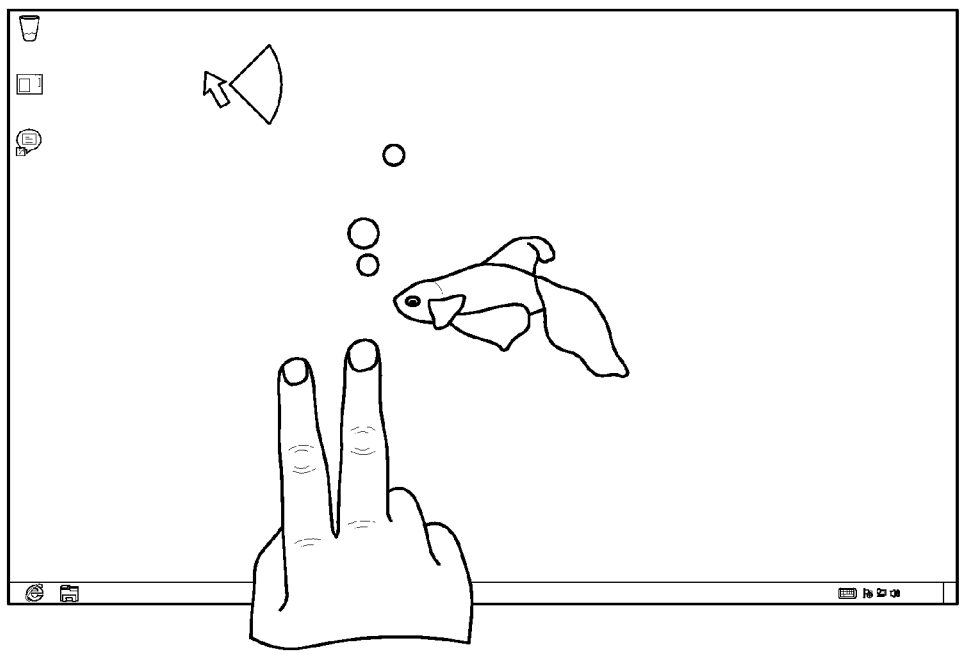

In FIGS. 8A and 8B, the user simulates the pressing of a right pointer control (such as a left mouse button). FIG. 8A is similar to FIG. 6C except without arrows to cleanly show the remote desktop. In FIG. 8A, the user contacts (or retains contact with) the display, thereby the display is engaged as a trackpad input device, although there is no movement of the cursor in the example of FIGS. 8A and 8B. In FIG. 8B, the user contacts a second finger to the display rightwards of the current position of the initial finger. This simulates pressing a right pointer control (such as a right mouse button). The user releases the right pointer control by simply removing the second finger. Thus, the user may intuitively simulate pressing and releasing of a right pointer control.

In sum, a mechanism is provided by which a user may intuitively engage the display as a trackpad input device, and intuitive simulate the pressing and releasing of left and/or right pointer controls. This allows the user to quickly learn to efficiently engage in more complex interactions with the display to enable more complex tasks to be performed.

Figure 9A:
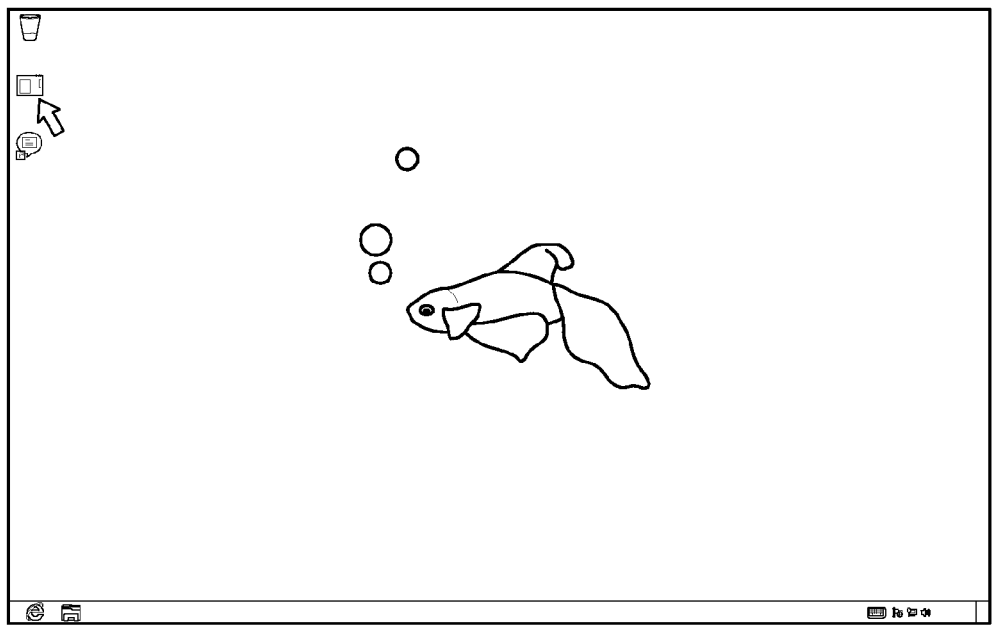
FIGS. 9A through 9F illustrate a first user scenario in which the user drags a desktop icon from one portion of the desktop to another.

For instance, FIGS. 9A through 9F illustrate user scenario in which the user drags a desktop icon from one portion of the desktop to another, and drops the desktop icon at the new location. FIG. 9A illustrates the desktop in an initial state with three desktop icons in the upper left corner of the desktop. The cursor position is currently on the middle desktop icon, which is to be moved. The cursor position could have been previously moved there by the user engaging the display as a trackpad.

Figure 9B:
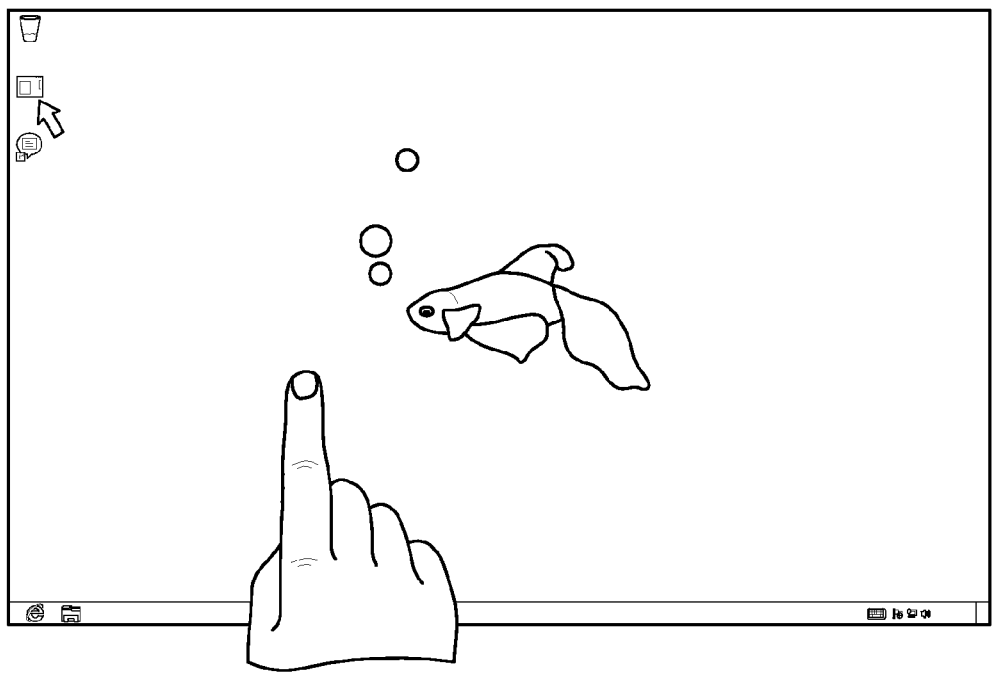
Figure 9C:
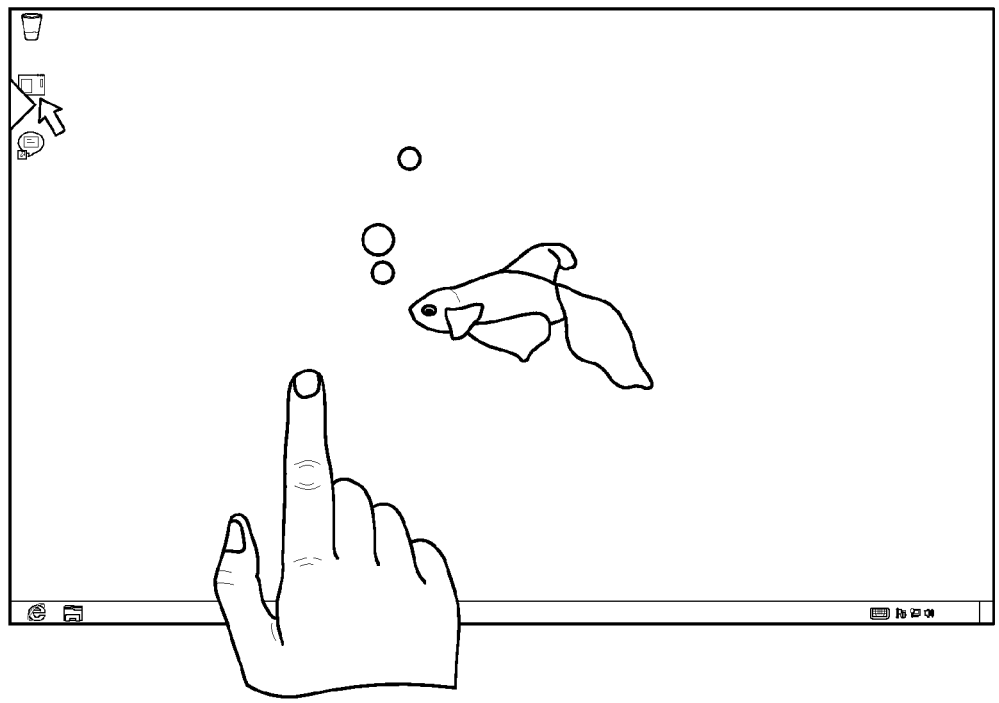

FIG. 9B illustrates a user making initial user contact with the display with an initial finger thereby engaging the display as a trackpad. Again, the initial cursor position is independent of the initial position of the initial user contact. In FIG. 9C, the user then contacts a second finger to the left of the current position of the initial user contact, simulating pressing of a left pointer control, which selects the middle icon to be moved along with the cursor position.

Figure 9D:
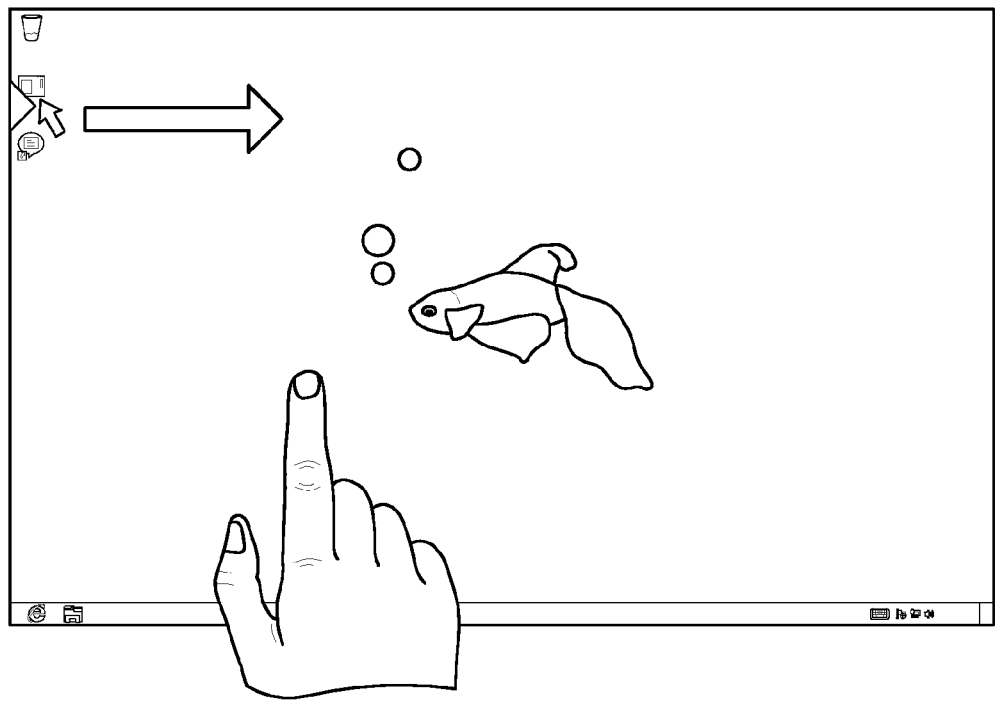
Figure 9E:
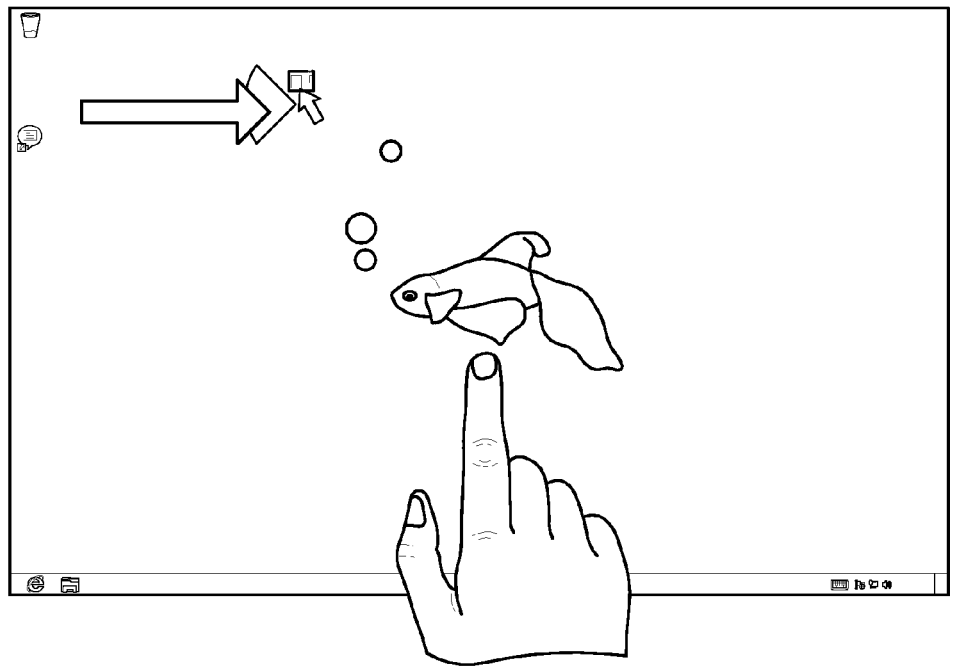
Figure 9F:
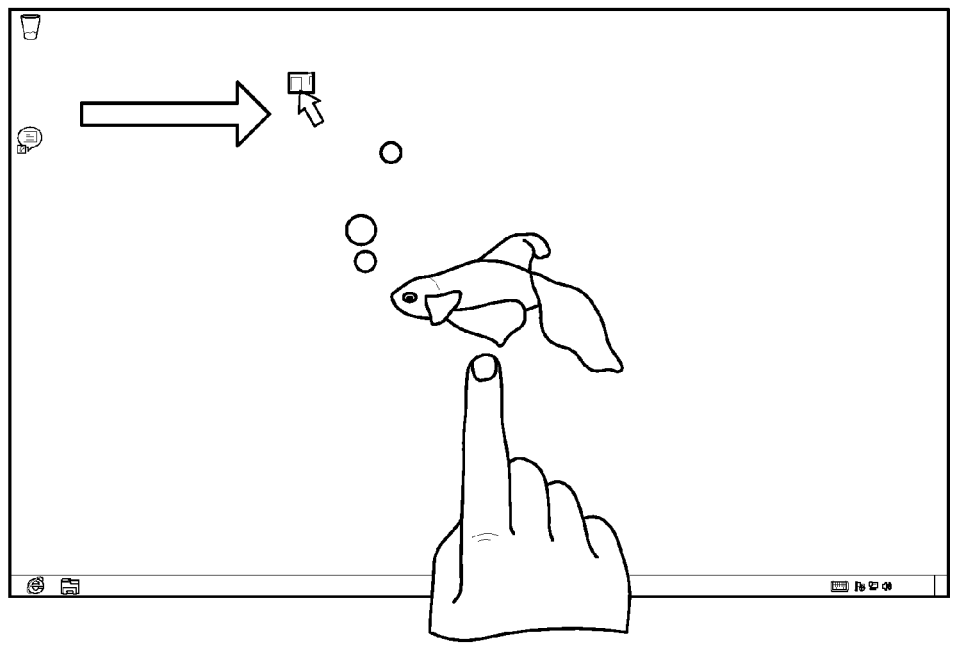

FIG. 9D illustrates an intended direction of movement of the desktop icon and cursor. FIG. 9E illustrates the movement of the desktop icon in the same direction as the movement of the dragging of the initial finger of the user. Since the left finger was also dragged, this simulates the continued pressing of the left pointer control, thereby enabling the selected desktop icon to continue to be moved with the cursor. However, the cursor moves with the dragging motion of the initial finger, rather than the left finger. FIG. 9F illustrates the user releasing the left finger thereby simulating a left pointer control release, thereby dropping the desktop icon at its final position in this example.

Figure 10A:
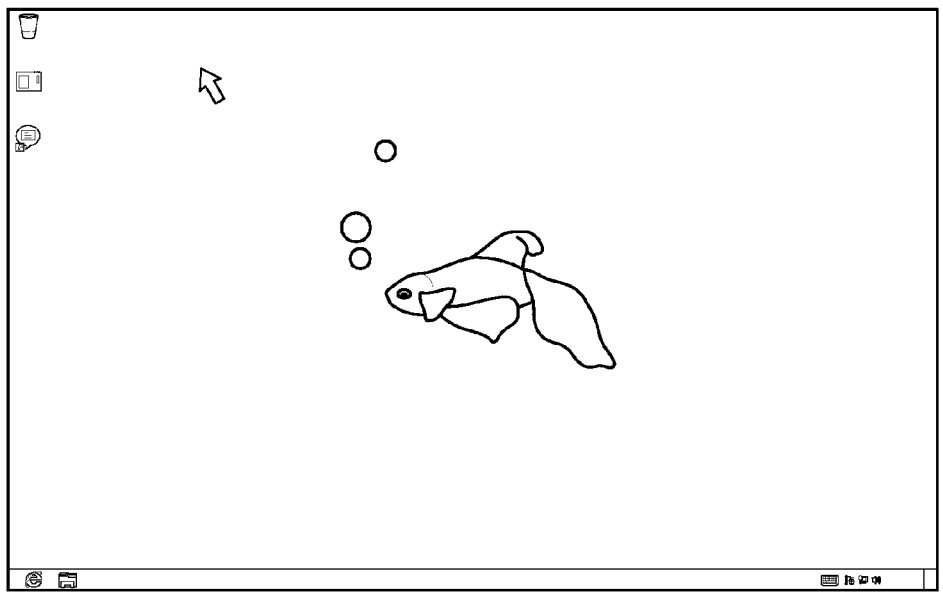
FIGS. 10A through 10H illustrate a second example in which the user want to view the screen resolution.
Figure 10B:
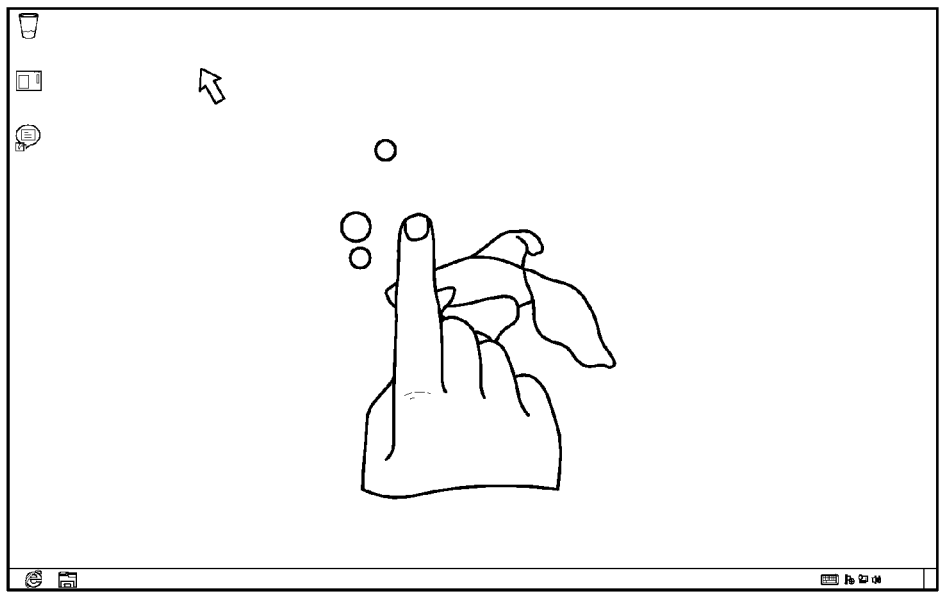
Figure 10C:
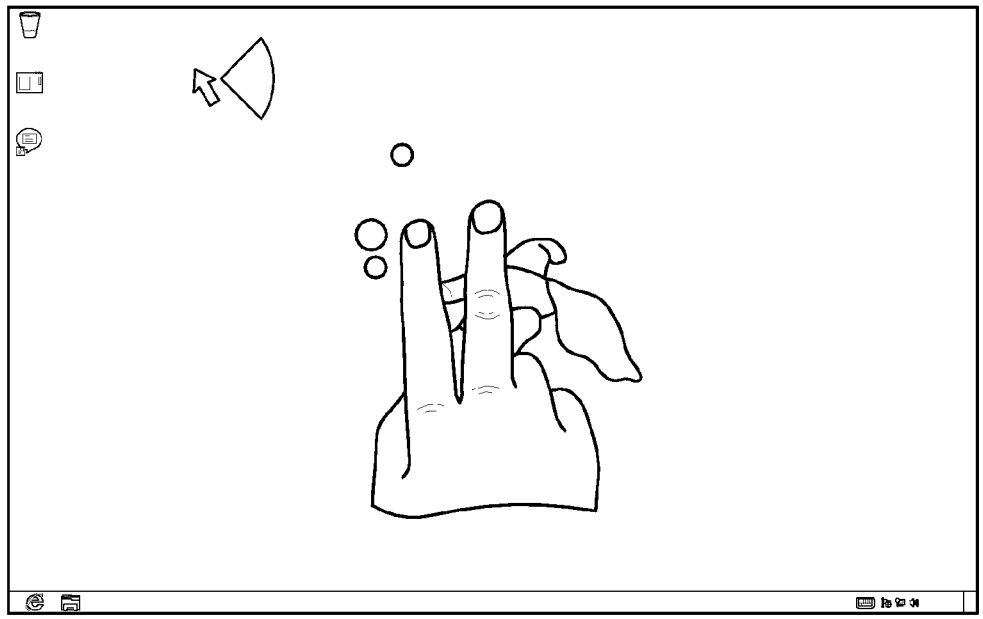
Figure 10D:
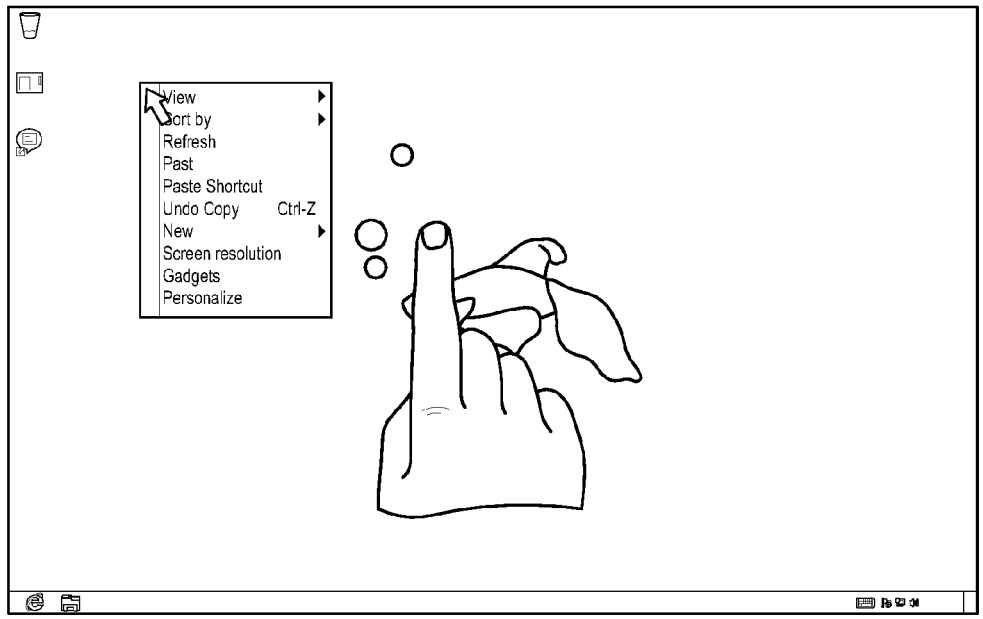

FIGS. 10A through 10H illustrate a second example in which the user want to view the screen resolution. FIG. 10A illustrates the desktop in an initial state. FIG. 10B illustrates a user making initial user contact with the display with an initial finger thereby engaging the display as a trackpad. In FIG. 10C, the user then contacts a second finger to the right of the current position of the initial user contact, simulating pressing of a right pointer control. FIG. 10D also shows that the user released the right finger thereby simulating release of the right pointer control. In WINDOWS, the pressing, and subsequent releasing, of a right mouse control when the cursor is positioned above the desktop causes a context menu to appear upon releasing the right mouse control as illustrated in FIG. 10D. However, the menu remains displayed since the menu would normally remain displayed upon releasing the right mouse button.

Figure 10E:
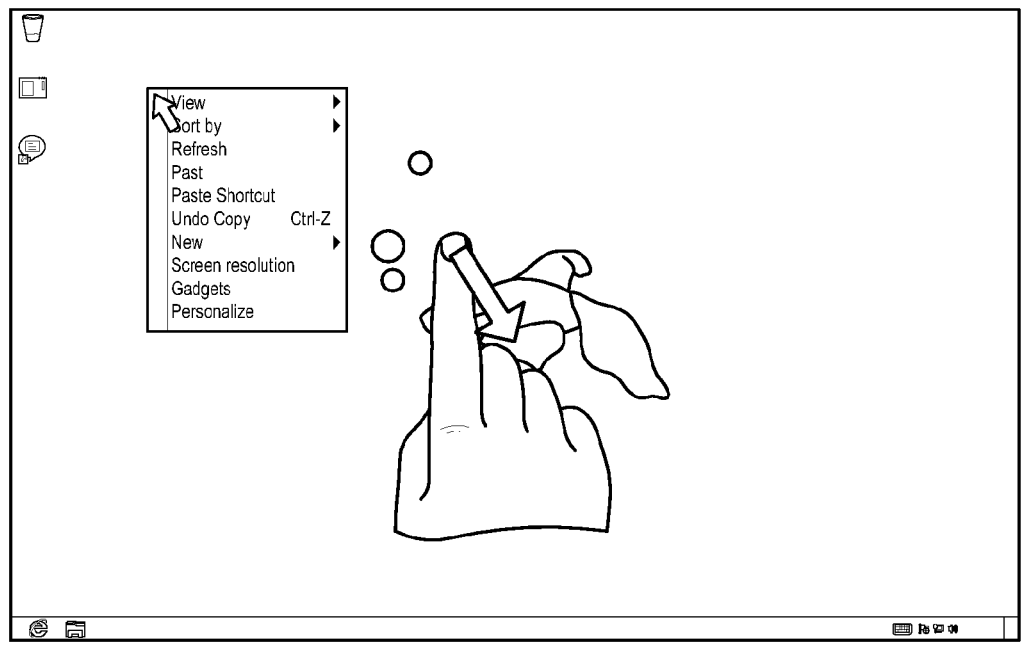
Figure 10F:
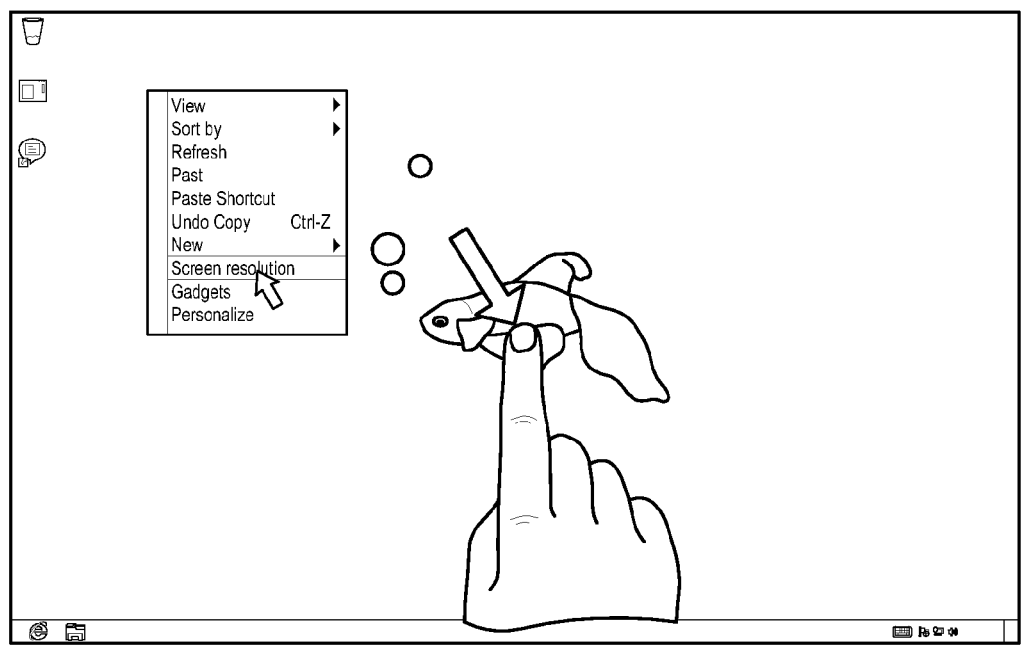

The user wants to move the cursor to the "screen resolution" option in the menu, and so the user intends to move the initial finger in the direction illustrated in FIG. 10E, so that the cursor also moves in the same relative direction (hence simulating trackpad functionality). FIG. 10F shows the completion of this dragging motion, in which the cursor is now positioned over the "screen resolution" option.

Figure 10G:
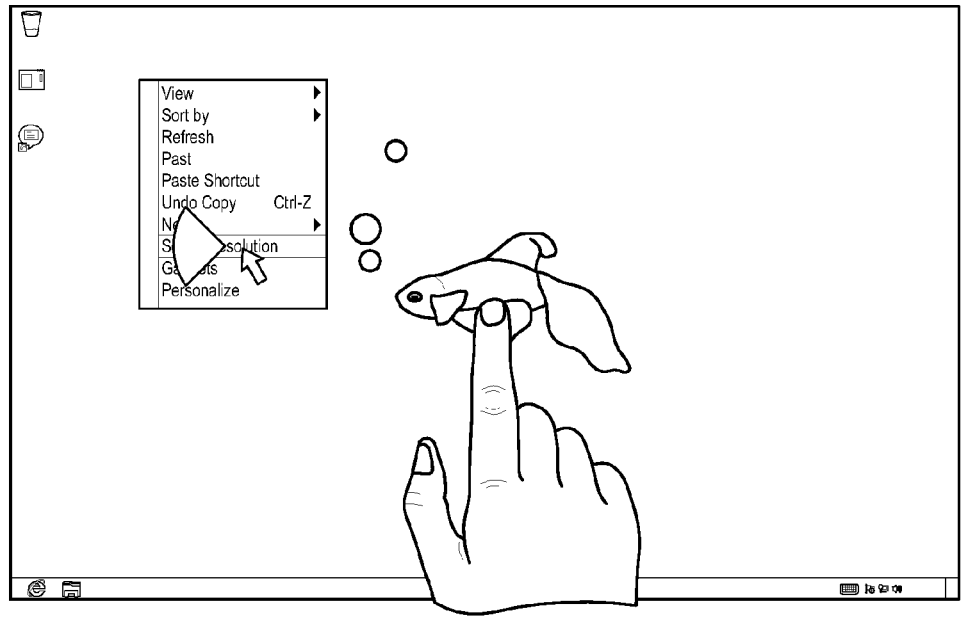
Figure 10H:
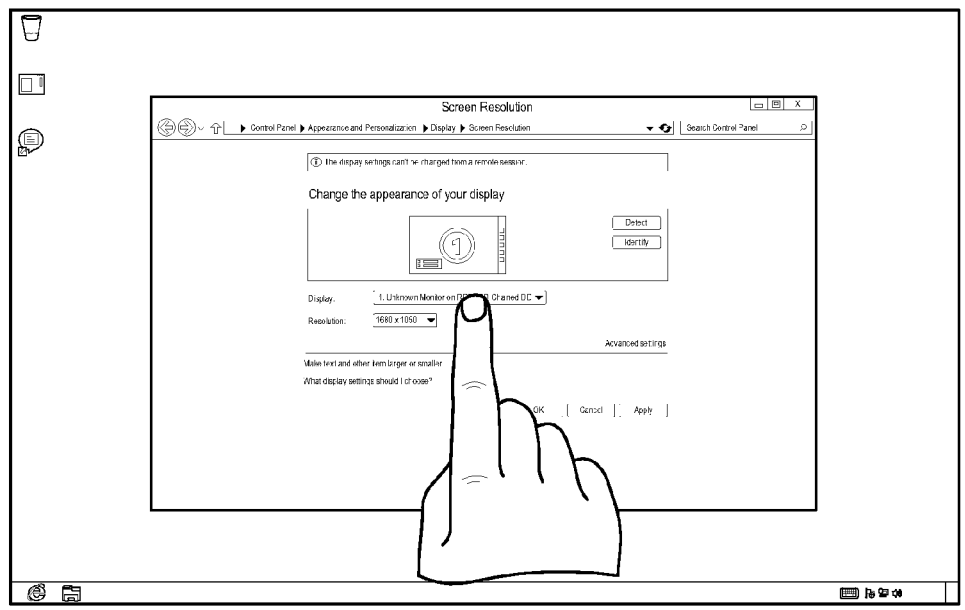

In FIG. 10G, the user contacts a finger to the left of the current position of the initial contact, thereby simulating pressing of a left pointer control. The user then releases all user contacts, thereby simulating release of the left pointer control (causing a screen resolution window to appear). Furthermore, by releasing the initial finger, the display is disengaged as a trackpad, and tap is thus enabled. In fact, in FIG. 10H, if the user were to tap a finger on the display, this would simulate clicking (pressing and then quickly releasing) the left pointer control at the current position of the cursor.

Thus, a powerful mechanism to use a multi-touch display to perform remote desktop operations has been described. The principles described herein may further be extended to any user interface environment that uses multi-touch displays, even outside of the context of remote desktop technology. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable hardware storage devices having thereon computer-executable instructions that are structured such that, when executed by one or more processors of a local computing system, cause the computing system to perform a method for accessing and controlling a remote desktop of a remote computing system using a multi-touch display of the local computing system, the method comprising:

displaying a remote desktop on the multi-touch display of the local computing system; and upon detecting an initial point of user contact with the multi-touch display when the display is not engaged as a trackpad, engaging the multi-touch display as a trackpad; and initiating a cursor pointer for controlling the multi-touch display as the trackpad, the cursor pointer's position being independent of the initial point of user contact, the cursor being controllable from any part of the multi-touch display.

2. The computer program product in accordance with claim 1, the method further comprising the following after detecting the user contact with the multi-touch display when the display is not engaged as a trackpad:

disabling one or more pointer devices capable of providing pointer input to the multi-touch display while the multi-touch display is engaged as the trackpad.

3. The computer program product in accordance with claim 2, wherein the one or more pointer devices comprise a mouse.

4. The computer program product in accordance with claim 1, wherein if the cursor pointer is within a predetermined distance from a border of the multi-touch display, the content of the multi-touch display is auto-scrolled in a direction of the border.

5. The computer program product in accordance with claim 1, wherein the user contact is a first user contact, the method further comprising the following upon detecting a second user contact while the first user contact is still applied to the multi-touch display:

if the second user contact is within a relative position with respect to the first user contact, interpreting the second user contact as a pressing of a pointer control, and causing a control press command to be transmitted to the remote computing system.

6. The computer program product in accordance with claim 5, wherein the pointer control is interpreted as remaining pressed until either the first or second user contact has ended, after which a control release command is transmitted to the remote computing system.

7. The computer program product in accordance with claim 5, wherein the interpreting of the second user contact as the pressing of a pointer control is interpreting of the second user contact as a pressing of a left pointer button control.

8. The computer program product in accordance with claim 7, wherein the relative position of the second user contact is left of the first user contact.

9. The computer program product in accordance with claim 5, wherein the interpreting of the second user contact as the pressing of a pointer control is interpreting of the second user contact as a pressing of a right pointer button control.

10. The computer program product in accordance with claim 9, wherein the relative position of the second user contact is right of the first user contact.

11. The computer program product in accordance with claim 5, wherein the second user contact is a first of a plurality of user contacts made within the relative position of the first user contact, wherein the pointer control is interpreted as remaining pressed until all of the plurality of user contacts have been removed from the multi-touch display or until the first user contact has been removed from the multi-touch display, after which a control release command is transmitted to the remote computing system.

12. The computer program product in accordance with claim 5, wherein the relative position is a first relative position, and the pointer control is a first pointer control, wherein
if the second user contact is within a second relative position with respect to the first user contact, interpreting the second user contact as a pressing of a second pointer control, and causing the interpretation to be transmitted to the remote computing system.

13. The computer program product in accordance with claim 12, wherein the first pointer control is a left pointer control, and the second pointer control is a right pointer control.

14. The computer program product in accordance with claim 13, wherein the first relative position is left of the first user contact, and the second relative position is right of the first user contact.

15. The computer program product in accordance with claim 1, wherein upon detecting movement of the user contact while the multi-touch display is engaged as a trackpad, the method further causes a cursor to move in approximately the same direction as the detected movement of the user contact, and causes a cursor movement command to be transmitted to the remote computing system.

16. The computer program product in accordance with claim 1, upon detecting the user contact is no longer in contact with the multi-touch display when the display is engaged as a trackpad, disengaging the multi-touch display as a trackpad.

17. The computer program product in accordance with claim 1, wherein if the multi-touch display is disengaged as a trackpad, then a tap on the multi-touch display is interpreted as a click of a pointer control.

18. The computer program product in accordance with claim 17, wherein the pointer control is a left pointer control.

19. A computer-implemented method for accessing and controlling a remote desktop using a multi-touch display of a local computing system, the method comprising:
displaying the remote desktop on the multi-touch display of the local computing system;
detecting an initial point of user contact with the multi-touch display when the display is not engaged as a trackpad;
in response to detecting, engaging the multi-touch display as a trackpad; and
in response to detecting, initiating a cursor pointer for controlling the multi-touch display as the trackpad, the cursor pointer's position being independent of the initial point of user contact, the cursor being controllable from any part of the multi-touch display.

20. A computer program product comprising one or more computer-readable hardware storage devices having thereon computer-executable instructions that are structured such that, when executed by one or more processors of a local computing system, cause the computing system to perform a method for accessing and controlling a remote desktop using a multi-touch display of a local computing system, the method comprising:
displaying the remote desktop on the multi-touch display of the local computing system; and
upon detecting a first user contact with the multi-touch display when the display is not engaged as a trackpad, engaging the multi-touch display as a trackpad; and assigning the user contact as a cursor pointer for controlling the multi-touch display as the trackpad; and
upon detecting a second user contact while the first user contact is still applied to the multi-touch display, if the second user contact is within a first relative position with respect to the first user contact, interpreting the second user contact as a pressing of a first pointer control, and causing a first control press command to be transmitted to the remote computing system, wherein the first pointer control is interpreted as remaining pressed until either the first or second user contact has ended, after which a first control release command is transmitted to the remote computing system; and
upon detecting a third user contact while the first user contact is still applied to the multi-touch display, if the third user contact is within a second relative position with respect to the first user contact, interpreting the third user contact as a pressing of a second pointer control, and causing a second control press command to be transmitted to the remote computing system, wherein the second pointer control is interpreted as remaining pressed until either the first or third user contact has ended, after which a second control release command is transmitted to the remote computing system.

* * * * *